UNITED STATES PATENT OFFICE.

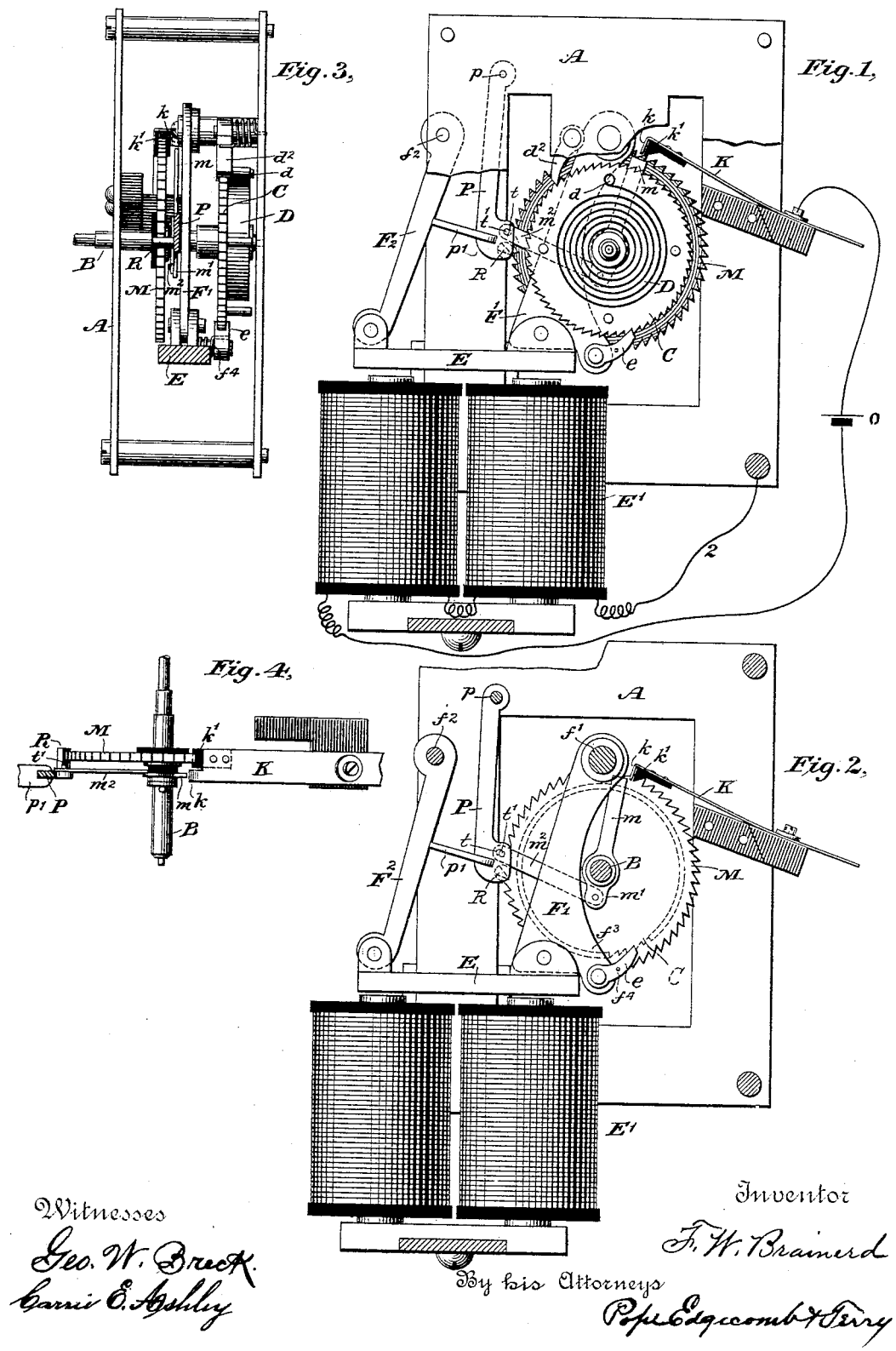

FRANK W. BRAINERD, OF CHICAGO, ILLINOIS.

SELF-WINDING ELECTRIC CLOCK.

SPECIFICATION forming part of Letters Patent No. 399,128, dated March 5, 1889.

Application filed May 25, 1888. Serial No. 275,043. (No model.)

*To all whom it may concern:*

Be it known that I, FRANK W. BRAINERD, a citizen of the United States, residing at Chicago, in the county of Cook, in the State of Illinois, have invented certain new and useful Improvements in Self-Winding Electric Clocks, of which the following is a specification.

The invention relates to the construction of devices for automatically winding the driving or main spring of a clock-movement through the instrumentality of electricity.

The object of the invention is to provide a reliable device for giving a step-by-step movement to the winding mechanism, which will insure an immediate interruption of the circuit-connections after each step-by-step movement, thereby saving the battery-power and also occasioning the retractile movement of the armature-lever by the unwinding of the clock.

The invention will be described in detail in connection with the accompanying drawings, in which—

Figures 1 and 2 are sectional views of the clock mechanism. Fig. 3 is a plan. Fig. 4 is a detail of the circuit-controlling device.

Referring to the figures, A represents the frame-work of a clock-movement; B, the central post or arbor for carrying the minute-hand. This hand and its connected wheels are not here shown. Upon the minute-hand arbor there is carried a toothed wheel, C, loosely mounted. The outer end of a coiled mainspring, D, is attached to a pin, $d$, upon this wheel, and the inner end of this spring is attached to the arbor. The wheel is driven forward step by step by means of a pawl, $e$, which is driven forward periodically by means of an armature, E, applied to an electro-magnet, E'. A dog, $d^2$, which is pivoted in any suitable manner from the frame of the machine, prevents a retrograde movement of the wheel. The spring is coiled in the proper direction for causing the minute-hand arbor to revolve in the usual manner.

The armature-lever E is supported in this instance upon two links, F' and F². These are respectively pivoted at or near the ends of the armature. The link F' is pivoted upon a stud, $f'$, and the link F² upon an arbor, $f^2$.

They are supported in such manner that when the magnet is vitalized they tend to carry the armature forward in a diagonal direction with reference to the poles, thus giving a forward movement to the pawl $e$. This pawl is carried upon a projection, $f^3$, from the link F', and a spring, $f^4$, tends to force it against the teeth of the winding-wheel.

The circuit through the magnet is closed by means of the end $k$ of a contact or spring, K, which is insulated from the frame-work. This end $k$ is bent downward, as shown. The contact-spring carries a wedge-shaped pawl or block, $k'$, resting upon the teeth of a second toothed wheel, M, which is rigid to the minute-hand arbor. As the clock unwinds, the teeth pass beneath this insulated block. The spring is thus gradually raised as a tooth passes beneath it, and is allowed to drop quickly when the crown of a tooth passes from beneath the pawl. The projection $k$ is then brought into contact with the end of an arm, $m$, which is loosely mounted upon the minute-hand arbor. This arm is in electrical connection through the frame with a conductor, 2, leading to the electro-magnet. The connections from the magnet are continued to one pole of the battery $o$. The other pole of the battery is connected with the spring K. The circuit being thus completed, the armature-lever is drawn forward, thus winding the spring D to a corresponding degree.

It is desirable that the circuit should be interrupted immediately after the winding has been completed, and for this purpose the arm $m$ is provided with a heel or extension, $m'$, which is connected by a link, $m^2$, with a pivoted arm, P. This arm is supported from the frame of the movement, as shown, by the arbor $p$, and it is provided with an extension, $p'$, which projects into the path of one of the links $f^2$. When the armature-lever is drawn forward, this link engages the extension and presses the lever forward, thus acting, through the link $m^2$, to turn the arm $m$ until it is out of contact with the end of the spring K, thus interrupting the circuit-connections when the armature-lever has gone forward a sufficient distance to turn the winding-wheel a space corresponding to one tooth. As it is necessary, however, that the arm should be returned to a proper position to again make contact with the spring K, the lever P is forced back by the subsequent forward movement of the wheel M, through the instrumentality of a pawl, R, carried upon the lever P. This pawl is engaged by the teeth of the wheel M, and as it revolves the lever P is gradually forced back. This replaces the arm $m$; but meanwhile the spring K, with its contact-point $k'$, has been raised out of the path of the arm $m$, so that no contact will be made until the pawl $k'$ escapes over the next tooth.

The forcing back of the lever P serves to carry the armature E away from the poles of its electro-magnet E'. In other words, the main or driving spring of the clock acts through the going part in lieu of a retractile spring for the armature-lever.

The mechanical coupling of the lever P with the arm $m$ through the link may allow of more or less play, as shown, by the elongated slot $t$ in the link, through which the pin $t'$ extends from the lever P, thereby insuring that the interruption of the circuit shall not occur until after the spring has been wound or the winding-wheel carried forward one notch.

It is evident that the armature may be mounted in a different manner, and that the general construction of the instrument may be greatly varied without departing from the spirit of the invention.

I claim as my invention—

1. The combination, with a clock-movement, of an electro-magnet and its armature for winding the same, a pawl carried by the armature giving a step-by-step movement to the winding mechanism, a toothed wheel operated by the clock-train, a circuit-closing device operated by the toothed wheel, and a circuit-interrupting device operated by the armature-lever at the limit of its forward movement.

2. The combination of a clock-movement, an electro-magnet, its armature for winding the driving-spring of the clock step by step, a contact-arm loosely mounted upon the minute-hand arbor of the movement, a circuit-closing spring operated by a wheel moving with the minute-hand arbor to make contact with the contact-arm, and thus periodically complete the connections through the winding-magnet, and an arm movable with the armature for moving said contact-arm out of contact with the circuit-closing spring.

3. The combination of a clock-movement, a spring having one end attached to the central arbor, a wheel surrounding said arbor, to which the other end is attached, a pawl for driving the wheel, an electro-magnet and its armature for periodically operating the pawl, a wheel or cam moving with the clock-train, and mechanical connections therewith for forcing the armature away from its electro-magnet after each forward movement as the clock unwinds, substantially as described.

4. In a self-winding clock-movement, the combination of an electro-magnet and its armature, the pivoted contact-arm $m$, the circuit-closing spring K, a wheel moving with the clock-train for operating the circuit-closing spring, and a system of levers engaging the contact-arm and moving it out of contact with said spring by the forward movement of the armature, substantially as described.

5. In a self-winding electric clock, an electro-magnet and its armature for giving a step-by-step movement to the winding mechanism, a toothed wheel advanced by the forward movement of the clock-train, a pawl engaging the teeth of the wheel, and a lever operated by the pawl and engaging the support of said armature and gradually forcing the latter away from the poles of its magnet as a tooth of the wheel passes under said pawl.

6. In a self-winding electric clock, the combination, with the electro-magnet E' and its armature E, and a pawl carried by the armature, of the loosely-mounted lever P, the links supporting the armature, one of which is engaged by said lever P, the wheel M, moving with the clock-movement, and the pawl carried by the lever P and engaged by the teeth of said wheel.

7. In a self-winding electric clock, the combination of the electro-magnet E' and its armature E, a pawl, $e$, moving with the armature, the loosely-mounted lever P, the links supporting the armature, one of which is engaged by said lever P, the wheel M, moving with the clock-movement, the pawl carried by the lever P and engaged by the teeth of said wheel, the loosely-mounted contact-arm $m$, the circuit-closing spring applied to the contact-arm and controlled by said wheel, and a link-connection between said contact-arm and the lever P for removing the arm from the contact with the spring.

In testimony whereof I have hereunto subscribed my name this 15th day of May, A. D. 1888.

FRANK W. BRAINERD.

Witnesses:
CHESTER H. REED,
W. E. WITHERBEE.